United States Patent
Wada et al.

(10) Patent No.: US 7,628,542 B2
(45) Date of Patent: Dec. 8, 2009

(54) BEARING VIBRATION DAMPING MECHANISM

(75) Inventors: Hisao Wada, Kobe (JP); Hideo Kaido, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 385 days.

(21) Appl. No.: 11/631,157

(22) PCT Filed: Feb. 28, 2005

(86) PCT No.: PCT/JP2005/003313

§ 371 (c)(1),
(2), (4) Date: Dec. 29, 2006

(87) PCT Pub. No.: WO2006/018915

PCT Pub. Date: Feb. 23, 2006

(65) Prior Publication Data

US 2008/0292234 A1   Nov. 27, 2008

(30) Foreign Application Priority Data

Aug. 17, 2004   (JP) ............................. 2004-237381

(51) Int. Cl.
*F16C 27/00* (2006.01)
(52) U.S. Cl. ........................... 384/535; 384/99
(58) Field of Classification Search ............ 384/99, 384/535, 536, 581, 582
See application file for complete search history.

(56) References Cited

U.S. PATENT DOCUMENTS

| | | | | |
|---|---|---|---|---|
| 2,534,142 A | * | 12/1950 | Morton et al. | 384/535 |
| 4,223,958 A | * | 9/1980 | Gray | 384/99 |
| 5,215,384 A | * | 6/1993 | Maier | 384/99 |
| 5,427,455 A | * | 6/1995 | Bosley | 384/106 |
| 5,988,888 A | | 11/1999 | Une et al. | |
| 6,065,875 A | | 5/2000 | Mitsubori et al. | |

FOREIGN PATENT DOCUMENTS

| | | |
|---|---|---|
| DE | 3736477 A1 * | 5/1989 |
| JP | A 60-136615 | 7/1985 |
| JP | U 62-122919 | 8/1987 |
| JP | A 4-091822 | 3/1992 |
| JP | A 10-085837 | 4/1998 |
| JP | A 11-002240 | 1/1999 |
| JP | A 11-022475 | 1/1999 |

* cited by examiner

*Primary Examiner*—Thomas R Hannon
(74) *Attorney, Agent, or Firm*—Oliff & Berridge, PLC

(57) ABSTRACT

A squeeze film damper for a bearing and a vibration damping mechanism capable of damping the vibration of a rolling bearing are provided. The squeeze film damper is small in construction and can be easily made by mass production. The vibration damping mechanism is capable of damping both radial and axial vibrations. A bearing housing 15 is provided with a bearing holding bore 16 of a diameter greater than the outside diameter of the outer ring 14 of a bearing, and an oil hole 19 through which oil is supplied into the bearing holding bore 16. A vibration damping mechanism 1 is formed by inserting a thin, flat sheet 17 provided with slits into an annular space formed between the inner wall of the bearing holding bore 16 and the outside surface of a bearing held in the bearing holding bore 16 so as to surround the bearing. Parts of the thin, flat sheet extending between the adjacent slits serve as elastic beams. The elastic beams center the bearing and support the centered bearing elastically. The vibration of the bearing is damped by the squeeze film effect of an oil film formed by supplying oil into the annular space.

13 Claims, 4 Drawing Sheets

BEARING VIBRATION DAMPING MECHANISM

TECHNICAL FIELD

The present invention relates to a bearing vibration damping mechanism capable of exerting a damping action on a rolling bearing, and more particularly to a supplementary mechanism facilitating the adjustment of the damping characteristic of a squeeze film damper for a bearing.

BACKGROUND ART

Rolling bearings are used widely in a variety of machines because rolling bearings, as compared with sliding bearings, cause small friction loss. Effective damping action for damping the vibration of a rolling bearing when rotating speed rises beyond a critical speed can be scarcely expected from the rolling bearing in view of the construction of the rolling bearing. Therefore, a damper is incorporated into a rolling bearing to provide the rolling bearing with a vibration damping ability in order to reduce vibrations of a machine and dynamic load on the rolling bearing and to extend the life of the bearing.

A squeeze film damper is used in combination with the rolling bearing.

The squeeze film damper is applied to the outer circumference of the bearing. The damping effect of a squeeze film of a fluid lubricant damps the vibration of the bearing.

The squeeze film damper applied to the outer circumference of the bearing can exercise a necessary damping ability without changing the intrinsic tribological characteristic of the bearing.

Generally, the dynamic characteristic of a damping oil film is a function of eccentricity ratio. In a state where a damper journal is moved aside such that the eccentricity ratio is nearly equal to 1.0, the dynamic characteristic of the damping oil film has strong nonlinearity and it is difficult to design a proper damper.

Therefore, a squeeze film damper including an axially disposed cage-shaped centering spring as shown in FIG. 9 is used widely. The centering spring centers the journal of the shaft so that the axis of the journal approaches the axis of the damper and a damping oil film is formed around the journal in a uniform thickness and the eccentricity ratio approaches zero. When the journal is thus centered and the dynamic characteristic of the damping oil film is in a range of weak nonlinearity, the dynamic characteristic of the damping oil film when the eccentricity ratio is approximately zero can be used and hence the damper can be comparatively easily designed.

Since the cage-shaped centering spring is disposed axially, the squeeze film damper has complicated construction and is large. Therefore, the squeeze film damper has been applied only to limited machines, such as turbines.

A squeeze film damper bearing disclosed in Patent document 1 is provided with a centering spring inserted into a space between a bearing supporting a rotating shaft and a bearing case. The centering spring is in a thin stainless steel strip provided with protrusions of the same height formed by press working. The centering spring is bent in a cylindrical shape. The centering spring formed in a cylindrical shape is fitted in a groove formed in the inner circumference of the bearing case to support the bearing elastically such that a space of a thickness between 0.1 and 0.2 mm is formed between the outer circumference of the bearing and the bearing case. Oil is supplied into the space to form an oil film capable of damping the whirling motion of the rotating shaft.

The method, as compared with other known methods, can make the squeeze film damper bearing at a low cost, can form a centering spring having a desired spring stiffness selected from a wide range of spring stiffness. However, the method that forms the plurality of protrusions by press working has difficulty in forming the protrusions accurately in the same height and in designing and fabricating a centering spring having a desired rigidity.

Patent document 1: JP 11-2240 A

DISCLOSURE OF THE INVENTION

Problem to be Solved by the Invention

It is an object of the present invention to provide a bearing with a small damper, capable of being easily produced by a mass-production process. Another object of the present invention is to provide a vibration damping mechanism for a rolling bearing capable of bearing radial and thrust loads.

Means for Solving the Problem

A bearing vibration damping mechanism according to the present invention for a rolling bearing includes: a bearing; a bearing housing provided with a bearing holding bore having a diameter greater than the outside diameter of the bearing, and an oil hole through which oil is supplied into the bearing holding bore; and a thin, flat sheet provided with a plurality of slits; wherein the bearing is put in the bearing holding bore so that the bearing may not move axially out of the bearing holding bore and an annular space is formed between the inner wall of the bearing holding bore and the bearing to permit the radial movement of the bearing, the thin, flat sheet is inserted into the annular space so as to surround the bearing, and frictional engagement of a spring and the housing produces a vibration damping effect. An oil film formed by supplying oil into the annular space and parts of the thin flat plate between the adjacent slits serving as elastic beams and being in contact with the bearing so as to support the bearing elastically can damp vibrations.

In the bearing vibration damping mechanism according to the present invention, each of the parts of the thin flat plate between the adjacent slits is a straight, elastic beam having opposite ends resting on the inner wall of the bearing housing hole and serving as a centering spring. The resilient force of the elastic beams pushes the journal so that the axis of the journal may coincide with the axis of the vibration damping mechanism when the bearing is decentered. Consequently, the eccentricity ratio approaches zero and the thickness of the oil film becomes substantially uniform over the entire circumference of the bearing. Thus performance design can be comparatively easily carried out on an assumption that the damping characteristic of the bearing is approximately the same as that of the bearing when the eccentricity ratio is zero.

In the bearing vibration damping mechanism according to the present invention, the oil film of a lubricating oil or a lubricating grease is formed on the inner wall of the bearing holding bore to use the oil film as a squeeze film damper. The oil film of the lubricant serves as a squeeze film damper for damping the vibrations of the bearing.

A proper space needs to be formed between the bearing and the bearing housing by springs to use the squeeze film damper effectively. The vibration damping effect can be enhanced by promoting the flow of the oil in the space by the motion of the flat plate caused by the vibration of the bearing.

The bearing vibration damping mechanism of the present invention includes a small, inexpensive spring having an effect that can be easily estimated and capable of being easily put in place. The bearing vibration damping mechanism is small and inexpensive.

The slits of the thin, flat plate may be replaced by rows of many small holes. The thin, flat plate provided with the small holes arranged in rows instead of the slits can be easily made.

Generally, the outer surface of the outer ring of a bearing is cylindrical. The bearing holding bore for holding a bearing having a cylindrical outer ring is formed in a cylindrical hole. The thin, flat plate fitted in the annular space between the outer circumference of the outer ring and the inner wall of the bearing holding bore is formed in a cylindrical shape. The thin, flat plate has a rectangular shape when developed. The slits defining the elastic beams are perpendicular to the side edges of the thin, flat plate.

When the thin, flat plate is inserted into the annular space, the edges of the slits come into contact with the inner wall of the bearing holding bore and cuts the oil film. Therefore, it is preferable that a proper number of openings are formed at proper lengthwise intervals in a substantially middle part of the thin, flat plate to enable the oil of the grease to flow in the annular space.

When the outer circumference of the bearing has a conical shape, the inner wall of the bearing holding bore is formed in a conical shape so that the side wall is substantially parallel to the outer circumference of the outer ring when the bearing is held in the bearing holding bore and the thin, flat plate may be inserted into an annular space having the shape of a frustum. The outer circumference of the outer ring may be formed in the shape of a conical surface or may be formed in the shape of a symmetrical combination of two conical surfaces.

A member having the shape of a frustum or a bicone in the form of two cones placed with their bases together may be put on the outer ring of the bearing.

The thin, flat plate capable of being inserted into the annular space is formed by cutting a fan-shaped sheet of a shape resembling a part of a circular ring out of a flat sheet and forming slits in the fan-shaped sheet. When the thin, flat plate is inserted into the annular space so as to be in close contact with the inner wall of the bearing holding bore, parts of the thin, flat plate corresponding to the slits come into contact with the side wall and parts of the thin, flat plate each formed between the adjacent slits are spaced from the side wall and serve as elastic beams that exert a resilient force on the bearing.

The resilient force of each of the elastic beams can be decomposed into an axial force acting in a direction parallel to the axis of the bearing and a radial force acting in a direction perpendicular to the axis of the bearing. Therefore, the thin, flat plate is effective in bearing both an axial load and a radial load on the bearing.

The rigidity of the thin, plat plate can be adjusted by properly distributing the slits on the thin, flat plate. The slits may be designed so that the thin, flat plate inserted into the annular space may have a necessary rigidity.

When the width of the slits formed in the thin, flat plate is increased to reduce the width of the elastic beams, the rigidity of the thin, flat plate decreases. Therefore, the distribution of rigidity can be adjusted by adjusting the width of the slits.

Preferably, an oil groove in which the oil flows is formed around the annular space in the inner wall of the bearing holding bore. The edges of the slits pressed against the side wall obstruct the smooth flow of the oil across the slits. The oil groove enables the oil to flow across the slits so as to be uniformly distributed in the annular space, so that the vibration damping effect of the oil can be satisfactorily exercised.

Slots may be formed in the thin/flat plate along the longitudinal axis of the thin, flat plate so as to correspond to the oil groove. The slots promote the flow of the oil.

A flange may be formed at an end of the bearing housing to retain the bearing in place. The flange prevents the oil flowing in the bearing holding bore from leaking outside, prevents the breakage of the oil film and contributes to the enhancement of the vibration damping effect. Preferably, the flange is provided with an outlet hole for adjusting the rate of discharge of the oil or the grease.

The bearing vibration damping mechanism according to the present invention includes the thin, flat plate provided with the slits, serving as a spring and wound around the bearing and forms the thin space of a thickness in the range of several tens micrometers to several hundreds micrometers accurately between the spring and the bearing housing. Since the bearing is supported by the thin plate serving as a spring, the reduction of spaces in the bearing due to the thermal expansion of the bearing can be relieved and, consequently, the life of the bearing can be extended and designing the bearing can be facilitated.

BEST MODE FOR CARRYING OUT THE INVENTION

Bearing vibration damping mechanisms in the preferred embodiments according to the present invention for rolling bearings will be described.

First Embodiment

Figure 1:
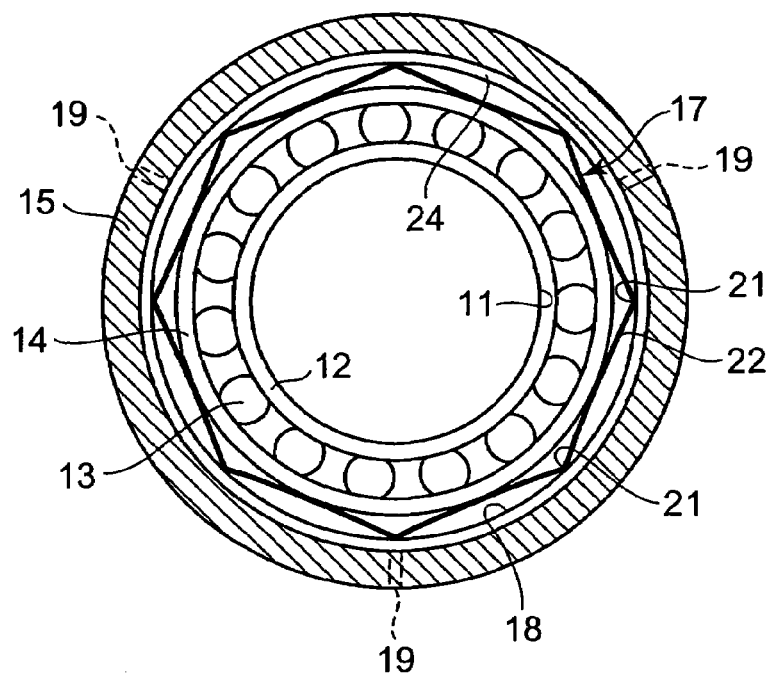
FIG. 1 is a plan view of a bearing vibration damping mechanism in a first embodiment according to the present invention for a rolling bearing.
Figure 2:
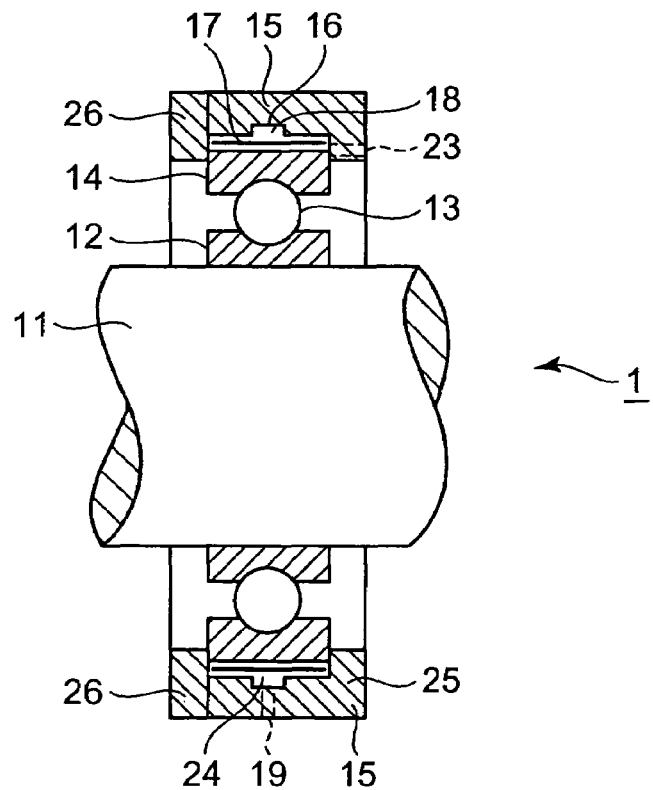
FIG. 2 is a longitudinal sectional view of the bearing vibration damping mechanism in the first embodiment.
Figure 3:
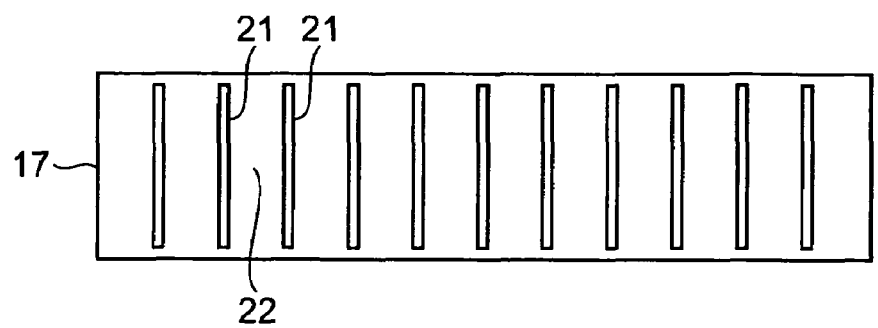
FIG. 3 is a plan view of a thin plate spring included in the bearing vibration damping mechanism in the first embodiment.
Figure 4:
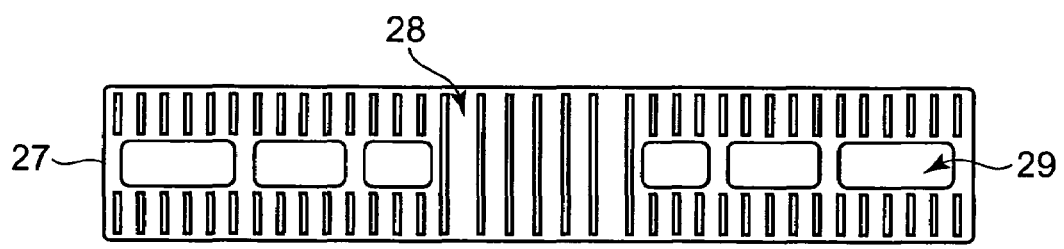
FIG. 4 is a plan view of another thin plate spring that can be included in the bearing vibration damping mechanism in the first embodiment.

A bearing vibration damping mechanism 1 in a first embodiment according to the present invention will be described with reference to FIGS. 1 to 4. FIG. 1 is a plan view of the bearing vibration damping mechanism 1, FIG. 2 is a longitudinal sectional view of the bearing vibration damping mechanism 1, FIG. 3 is a plan view of a thin plate spring included in the bearing vibration damping mechanism 1 and FIG. 4 is a plan view of another thin plate spring that can be included in the bearing vibration damping mechanism 1.

The bearing vibration damping mechanism 1 in the first embodiment is used in combination with a rolling bearing including an inner ring 12, rolling elements 13 and an outer ring 14. The bearing vibration damping mechanism 1 damps the vibration of the rolling bearing. As shown in FIGS. 1 and 2, a rotating shaft 11 is supported in the inner ring 12 and the inner ring 12 is supported by the rolling elements 13, such as balls or rollers, on the outer ring 14.

A groove 16 of a diameter slightly greater than the outside diameter of the outer ring 14 is formed in the inside surface of the bearing housing 15. The outer ring 14 is fitted in and retained in the groove 16. The groove 16 will be called a bearing holding bore 16.

A spring 17 is inserted into the bearing holding bore 16 so as to extend along the entire circumference of the bearing holding bore 16. As shown in FIG. 3, the spring 17 is formed by cutting a rectangular strip having a width slightly smaller than that of the outer ring 14 and a length slightly shorter than the circumference of the bearing holding bore 16 out of a thin, flat metal sheet having a thickness in the range of several tens micrometers to several hundreds micrometers, and forming a proper number of lateral slits 21 in a longitudinal arrangement in the rectangular strip. Since the spring 17 can be formed by cutting the rectangular strip out of the thin, flat metal sheet, the spring 17 can be very precisely formed by a photoetching process, namely, a technique developed for fabricating printed wiring boards. Identical springs 17 can be mass-produced on the industrial basis.

When the spring 17 is fitted into the bearing holding bore 16, parts of the spring 17 corresponding to the slits 21 come into contact with the inner wall of the bearing holding bore 16 and parts of the spring 17 between the adjacent slits 21 serve as elastic beams 22. The elastic beams 22 support the outer ring 14 elastically.

The rigidity of each elastic beam 22 is dependent on the quality of the thin, flat metal sheet. The thicker the thin, flat metal sheet, the shorter the intervals between the slits 21 or the wider the elastic beams 22, the higher the rigidity of the elastic beams 22. The physical relation between the rigidity of the elastic beams 22 and those factors affecting the rigidity of the elastic beams 22 can be substantially accurately known. The elastic beams 22 can be easily designed and the rigidity of the elastic beams 22 can be easily adjusted on the basis of those factors.

The elastic beams 22 arranged along and in contact with the entire circumference of the outer ring 14 support the bearing and serve as a centering spring for centering the bearing and the rotating shaft 11 supported in the bearing. A known centering spring is a cage-shaped member held between a side surface of a bearing and a fixed wall. This known centering spring enlarges a bearing unit. The present invention uses, as a centering spring, only the spring 17 formed by processing a very thin, flat sheet and inserted into the bearing holding bore 16 formed in the bearing housing to receive the bearing closely therein. Therefore, the centering spring is as small as a structure necessary for mounting a bearing on a bearing housing and is simple in construction.

A lubricating oil or grease is supplied through an oil hole 19 formed in the wall of the bearing housing 15 into a space 18 defined by the outer ring 14 and a side wall of the bearing housing 15 forming the bearing holding space 16 to form an oil film of a fluid lubricant on the side wall forming the bearing holding space. The oil film serves as a squeeze film damper that restricts the motion of the bearing to damp vibrations.

The thin, flat plate spring 17 moved by the vibration of the bearing promotes the flow of the oil thus forming the squeeze film damper to enhance the vibration damping effect.

When the thin, flat plate spring 17 is inserted into the annular space defined in the bearing holding bore 16, edges of the slits 21 come into contact with the inner wall of the bearing holding bore 16 and break the oil film.

An annular groove 24 is formed in the side surface of the bearing housing 15 defining the bearing holding bore 16 around the bearing holding bore 16 to ensure the flow of the oil. The annular groove 24 may be formed in the outer circumference of the outer ring 14.

Preferably, a discharge port of one oil hole 19 or discharge ports of a plurality of oil holes 19 open into the annular groove 24 formed in the bearing housing 15. When the plurality of oil holes 19 are formed, it is preferable to distribute the positions of the oil holes 19 taking into consideration the effect of gravity so that the oil can be uniformly supplied into the annular groove 24.

A flange 25 is formed on the bearing housing 15 at one end of the bearing holding bore 16. A bearing holding cover 26 is attached to the other end of the bearing housing 15 so as to hold the outer ring 14 of the bearing in place in the bearing holding bore 16. The bearing is held between the flange 25 and the bearing holding cover 26 to restrain the bearing from axial movement.

The flange 25 and the bearing holding cover 26 prevent the lubricating oil from leaking outside to enhance the damping effect. The flange 25 is provided with an outlet hole 23 of a proper size through which the lubricating oil is discharged properly to adjust the damping effect.

FIG. 4 shows a spring 27 having multiple functions provided with slits whose arrangement and shape are properly designed.

The slits of the spring 27 are arranged at proper intervals such that specific parts of the spring 27 has a proper rigidity dependent on the intervals of the slits.

For example, a part, namely, an elastic beam, between the adjacent widely spaced slits has a low rigidity as compared with those of other parts.

Rigid parts can be formed only in parts of the spring 27 corresponding to the opposite ends of the bearing by forming slots 29 in the spring 27 along the longitudinal axis of the spring 27. The slots 29 facilitate the flow of the lubricating oil and such.

In the bearing vibration damping mechanism in the first embodiment for the rolling bearing, a centering spring can be easily formed by winding the thin sheet provided with the slits around the bearing. A highly effective squeeze film damper can be formed by precisely forming the thin space between this spring and the bearing housing.

Since the bearing is supported by the thin plate spring, the reduction of spaces in the bearing due to the thermal expansion of the bearing can be relieved and, consequently, the life of the bearing can be extended.

Second Embodiment

A bearing vibration damping mechanism in a second embodiment according to the present invention for a rolling bearing includes a bearing housing provided with an annular groove having a triangular cross section instead of the bearing housing provided with the bearing holding bore 16 of the first embodiment. An annular member having a conical surface is attached to the outer ring of a bearing and is fitted in the annular groove. A thin, flat sheet provided with a plurality of slits is inserted into a space defined by the annular member and the bottom surface of the annular groove, a lubricating oil or a lubricating grease is supplied into the space to form a squeeze film damper for damping vibrations by the lubricating oil or grease.

In the bearing vibration damping mechanism in the second embodiment, the space formed between the annular member and the bottom surface of the annular groove has opposite parts inclined in opposite directions, respectively, to a perpendicular to the axis of the bearing. Therefore, the resilience of the spring inserted in the space can damp both thrust and radial vibrations.

Figure 5:
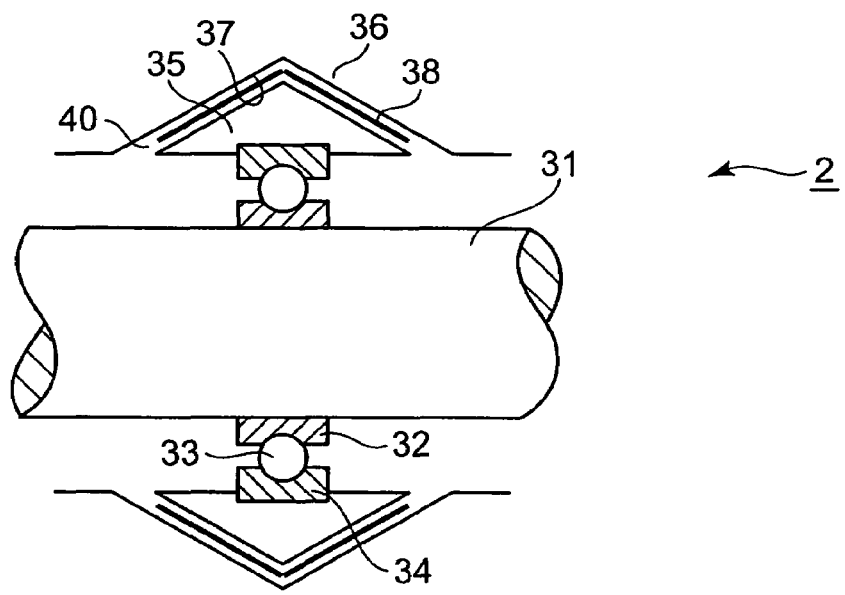
FIG. 5 is a longitudinal sectional view of a bearing vibration damping mechanism in a second embodiment according to the present invention for a rolling bearing.
Figure 6:
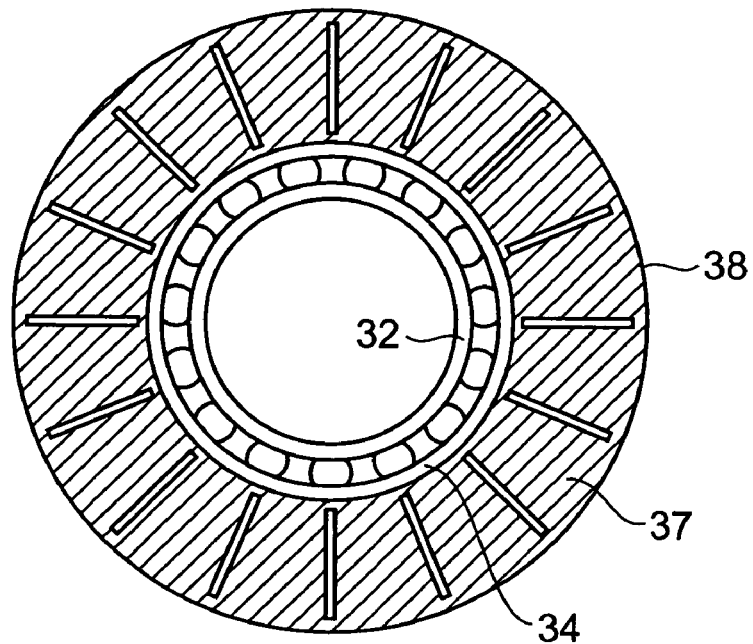
FIG. 6 is a side elevation of the bearing vibration damping mechanism in the second embodiment, in which a bearing housing is removed.
Figure 7:
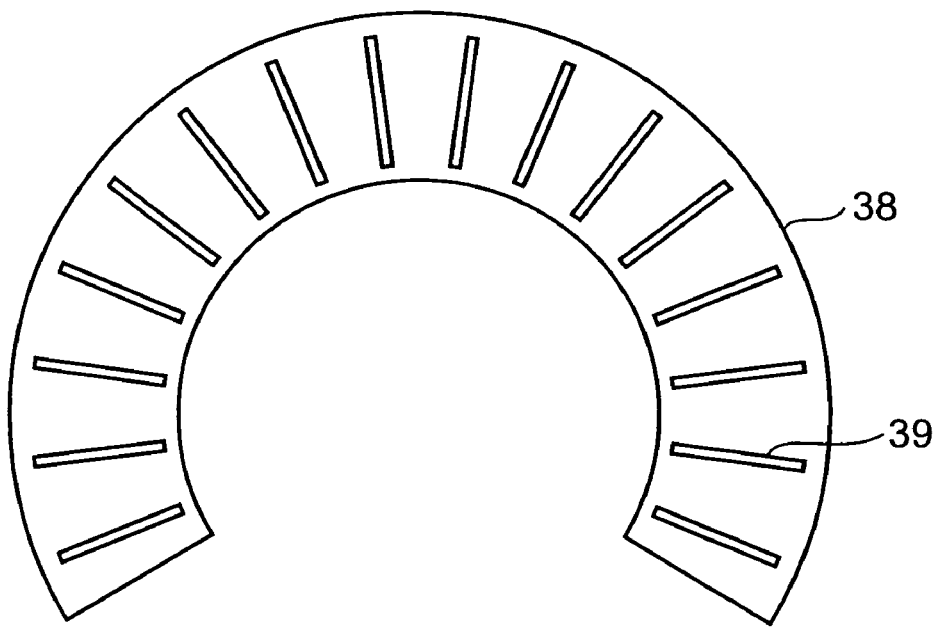
FIG. 7 is a plan view of a thin plate spring included in the bearing vibration damping mechanism in the second embodiment.
Figure 8:
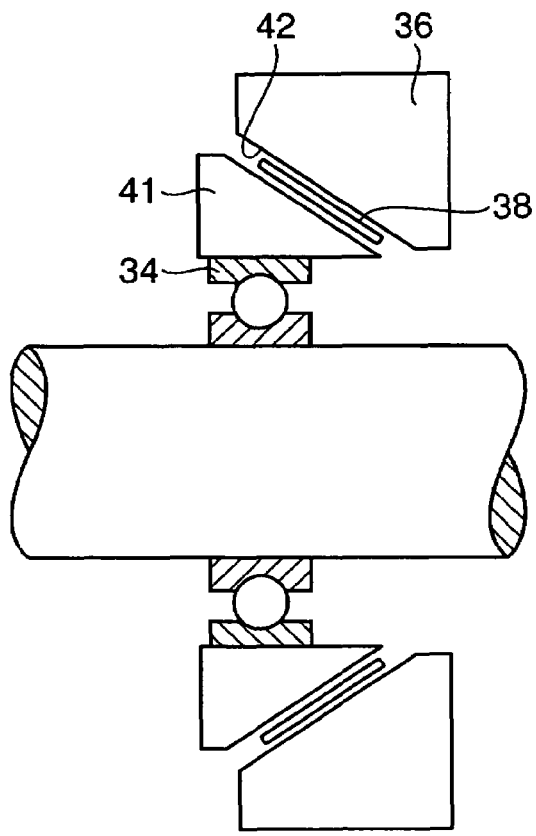
FIG. 8 is a longitudinal sectional view of a bearing vibration damping mechanism in a modification of the bearing vibration damping mechanism in the second embodiment.
Figure 9:
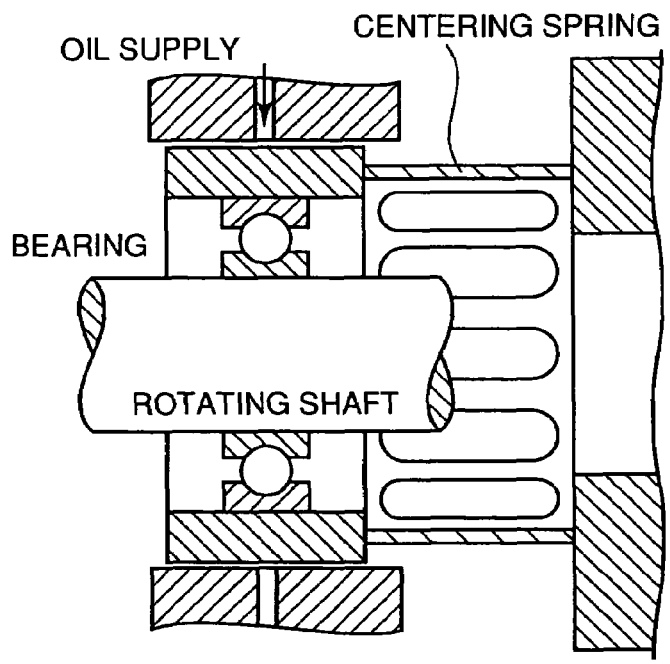
FIG. 9 is a longitudinal sectional view of a known squeeze film damper.

FIGS. 5 to 7 illustrate a bearing vibration damping mechanism 2 in a second embodiment according to the present invention for a rolling bearing. FIG. 5 is a longitudinal sectional view of the bearing vibration damping mechanism 2, FIG. 6 is a side elevation of the bearing vibration damping mechanism 2, in which a bearing housing is removed, FIG. 7 is a plan view of a thin plate spring included in the bearing vibration damping mechanism 2 and FIG. 8 is a longitudinal sectional view of a modification of the bearing vibration damping mechanism 2 in the second embodiment.

Referring to the drawings, the bearing vibration damping mechanism 2 is used in combination with a bearing including an inner ring 32, an outer ring 34, and rolling elements 33 held between the inner ring 32 and the outer ring 34. A rotating shaft 31 is supported in the inner ring 32. An annular member 35 is attached fixedly to the outer circumference of the outer ring 34.

The annular member 35 defines a space coaxial with its axis and two conical surfaces inclined in opposite directions to its axis. The annular member 35 has an inner surface provided with a groove for receiving the outer ring 34 and a roof-shaped outer surface tapering radially outward. A bearing housing 36 is provided with an annular groove 37 of a shape conforming to that of the outer surface of the annular member 35 to receive the outer part of the annular ring 35 therein. A space 40 for receiving thin, flat sheets 38 therein is defined by the outer surface of the annular member 35 and the bottom surface of the annular groove 37. A part, not shown, of the housing 36 defining the annular groove 37 can be removed to put the annular member 35 in the annular groove 37.

The two thin, flat sheets 38 are placed in the two conical parts of the space 40, respectively. Each thin, flat sheet 38 is flat and has a shape resembling a part of a circular ring as shown in FIG. 7. The thin, flat sheet 38 is provided with slits 39 arranged at proper intervals. The thin, flat sheet 38 formed in a conical shape by joining the ends thereof together is placed in the space 40 defined by the annular member 35 and the bottom surface of the annular groove 37. When the thin, flat sheets 38 placed in the space 40 defined by the annular member 35 and the bottom surface of the annular groove 37, parts of the thin, flat sheets 38 corresponding to the slits 39 rest on the bottom surface of the annular groove 37, parts of the thin, flat sheets 38 between the adjacent slits 39 are spaced from the bottom surface of the annular groove 37 and serve as elastic beams. Middle parts of the elastic beams are in contact with the outer surface of the annular member 35 to exert a resilient force on the outer surface of the annular member 35.

The force exerted by the elastic beams of the bearing vibration damping mechanism 2 on the conical surfaces is decomposed into resilient forces acting respectively in a direction perpendicular to the axis of the bearing. Thus the elastic beams exercise a vibration damping effect on both radial and axial vibrations.

A proper magnitude and a proper working direction of the resilient force can be selectively determined beforehand on the basis of the position in which the bearing is disposed and the vibrational characteristic of the bearing. Demand for a proper magnitude and a proper working direction of the resilient force can be met to some extent by selectively determining the shapes and positions of the slits 39 to be formed in the thin, flat sheet 38. Elastic beams formed between the adjacent slits 39 at shorter intervals have higher rigidity.

Oil holes and oil discharge holes, not shown, are formed in the bearing housing so as to open into the space 40 defined by the outer surface of the annular member 35 and the bottom surface of the annular groove 37. The oil supplied into the space 40 is caused to flow by the movement of the thin, flat sheets 38, lubricates surfaces defining the space 40 and exercises a squeeze film damping effect on damping the vibration of the bearing.

FIG. 8 shows a bearing vibration damping mechanism employing an annular member 41 having only one conical surface. The bearing vibration damping mechanism shown in FIG. 8 is similar in function to that shown in FIG. 5 and differs from the latter only in the shape of the annular member 41. In FIG. 8, parts having functions like those shown in FIG. 5 are designated by the same reference characters and will be briefly described.

The annular member 41 has a substantially triangular cross section. The annular member 41 has one conical outer surface and an inner surface provided with an annular groove for receiving the outer ring 34 of a bearing therein. A taper surface 42 parallel to the conical surface of the annular member 41 is formed in the inside surface of a housing 36. A thin, Flat sheet 38 provided with slits is held between the outer surface of the annular member 41 and the taper surface 42.

The thin, flat sheet 38, similarly to that employed in the bearing vibration damping mechanism shown in FIG. 5, is flat and has fan-shape resembling a part of a circular ring as shown in FIG. 7. Slits 39 are formed at proper intervals in the thin, flat sheet 38. The thin, flat sheet 38 inserted into the space between the annular member 35 and the surface of an annular groove 37 exerts force on the conical surface. Thus the thin, flat sheet 38 has a vibration damping effect of damping both axial and radial vibrations of the bearing.

As apparent from the foregoing description, the bearing vibration damping mechanism in this embodiment is very simple in construction and has a vibration damping effect of damping both axial and radial vibrations.

When the outer ring 34 is formed in a shape having two conical surfaces with bases thereof joined together similar to those of the annular member 35 or in a shape having one conical surface, the outer ring 34 can be made to exercise the function of the annular member without using any additional members.

The invention claimed is:

1. A bearing vibration damping mechanism comprising:
   a bearing;
   a bearing housing provided with a bearing holding bore having a diameter greater than an outside diameter of the bearing; and
   a thin, flat sheet provided with a plurality of slits, wherein;
   the bearing is put in the bearing holding bore so that the bearing may not move axially out of the bearing holding bore and an annular space is formed around the bearing to permit radial movement of the bearing;
   the thin, flat sheet is inserted into the annular space so as to extend circumferentially, and parts of the thin, flat sheet extending between adjacent slits have opposite ends resting on a side wall of the bearing holding bore and serve as elastic beams in contact with the bearing to support the bearing elastically and to dampen vibration of the bearing; and the bearing housing is provided with an oil hole through which oil is supplied into the bearing holding bore, oil is supplied into the annular space to form an oil film in the annular space.

2. The bearing vibration damping mechanism according to claim 1, wherein a outer circumference of the bearing is a cylindrical outer circumference of a outer ring of the bearing.

3. The bearing vibration damping mechanism according to claim 2, wherein the thin, flat sheet is a rectangular sheet, and the plurality of slits are formed widthwise of the thin, flat sheet.

4. The bearing vibration damping mechanism according to claim 3, wherein the thin, flat sheet is provided with at least one longitudinal oil passage opening extending along a longitudinal axis of the thin, flat sheet, and each of the slits coinciding with the oil passage opening is divided into two partial slits extending respectively on a opposite lateral side of the oil passage opening.

5. The bearing vibration damping mechanism according to claim 3, wherein the thin, flat sheet is provided with at least one longitudinal slot extending along a longitudinal axis of the thin, flat sheet, and each of the slits coinciding with the longitudinal slot is divided into two partial slits extending respectively on a opposite lateral side of the longitudinal slot.

6. The bearing vibration damping mechanism according to claim 1, wherein a outer circumference of the bearing is a conical outer circumference of a outer ring of the bearing.

7. The bearing vibration damping mechanism according to claim 6, wherein the thin, flat sheet has a fan-shape resembling a part of a circular ring having a uniform width, and the plurality of slits extend radially.

8. The bearing vibration damping mechanism according to claim 1, wherein a outer circumference of the bearing is conical outer circumference of an annular member put on a outer ring of the bearing.

9. The bearing vibration damping mechanism according to claim 8, wherein the annular member has one conical outer surface.

10. The bearing vibration damping mechanism according to claim 1, wherein an annular groove through which grease flows is formed so as to surround the annular space.

11. The bearing vibration damping mechanism according to claim 1, wherein a flange is formed at an end of the bearing housing to retain the bearing in place.

12. The bearing vibration damping mechanism according to claim 11, wherein a discharge hole for adjusting discharge of oil or grease is formed in the flange.

13. A bearing vibration damping mechanism comprising:
a bearing;
a bearing housing provided with a bearing holding bore having a diameter greater than an outside diameter of the bearing; and
a thin, flat sheet provided with a plurality of openings that are formed in rows widthwise of the thin, flat sheet, wherein:
the bearing is put in the bearing holding bore so that the bearing may not move axially out of the bearing holding bore and an annular space is formed around the bearing to permit radial movement of the bearing;
the thin, flat sheet is inserted into the annular space so as to extend circumferentially and parts of the thin, flat sheet extending between adjacent openings have opposite ends resting on a side wall of the bearing holding bore and serve as elastic beams in contact with the bearing to support the bearing elastically and to dampen vibration of the bearing; and
the bearing housing is provided with an oil hole through which oil is supplied into the bearing holding bore, oil is supplied into the annular space to form an oil film in the annular space.

* * * * *